: 3,754,072
PROCESS FOR RECOVERING VANADIUM OXIDE
Mitsuhiro Sato, Nisshin, Takeshi Yano, Shippo, Katsunosuke Hara, Kariya, Yuzo Nawa and Katsuhiro Maruyama, Nagoya, Japan, assignors to NGK Insulators, Ltd., Nagoya, Japan
No Drawing. Filed Dec. 10, 1971, Ser. No. 206,899
Claims priority, application Japan, Dec. 24, 1970, 45/117,203
Int. Cl. C01g 31/00
U.S. Cl. 423—66    6 Claims

ABSTRACT OF THE DISCLOSURE

The recovery of vanadium oxide comprises a stabilizing step wherein the distilled residue fractionated from crude titanium tetrachloride is contacted with superheated stream uniformly in the presence of air, carbonic acid gas and carbon monoxide or is mixed with water uniformly and then the mixture is heated and a recovering step wherein the stabilized residue is dissolved in an aqueous alkali solution or roasted together with an alkali salt.

BACKGROUND OF THE INVENTION

Field of the invention

The present invention relates to a process for recovering vanadium oxide and more particularly to a process for recovering vanadium oxide from the distilled residue fractionated from crude titanium tetrachloride.

The crude titanium tetrachloride can be obtained by mixing titanium ore or titanium oxide slag with coke and pitch, forming the mixture into briquets, heating the briquets at a high temperature to remove volatile substances fully, charging the sintered briquets into a chlorinating furnace and feeding gaseous chlorine at about 1,000° C. to effect chlorination. The thus resulting crude titanium tetrachloride is reduced by a reducing agent, such as hydrogen sulfide or oil coke and then purified by distillation to form spongy titanium. By this distillation the residue is fractionated from crude titanium tetrachloride. This distilled residue contains about 5–20% by weight of vanadium.

Description of the prior art

A process for recovering vanadium oxide from the distilled residue wherein the residue is roasted to remove volatile unuseful components and then is roasted together with an alkali salt and extracted with water and the extract is made slightly acidic with an acid to precipitate vanadium oxide, which is filtered off, has been proposed. However, in this process the vanadium component is lost by the first roasting step as vanadium chloride or vanadium oxychloride and accordingly the yield of vanadium is extremely low, at the utmost 20%. Furthermore, the residue obtained by using hydrogen sulfide as the reducing agent for crude titanium tetrachloride liberates hydrogen sulfide upon the roasting, which contaminates air.

Furthermore, in order to solve this defect, the following improved process has been known. The residue is left to stand in an electric furnace to heat and maintain a temperature higher than the condensation temperature of steam therein. Into such a furnace is introduced steam or air containing steam having a partial pressure of more than 200 mm. Hg under the condition that steam does not condense on the residue. Such a process is carried out instead of the first roasting process of the above known process. However, even in this improved process the reaction of the residue with steam is carried out only on the surface of the residue and does not reach to the interior; therefore, the vanadium component is lost in the same manner as in the first described known process and the improvement of the yield cannot be attained. Moreover, even in this process the residue obtained by using hydrogen sulfide as the reducing agent of crude titanium tetrachloride liberates hydrogen sulfide.

SUMMARY OF THE INVENTION

The object of the present invention is to recover vanadium oxide in a high yield from the distilled residue fractionated from crude titanium tetrachloride.

The process for recovering vanadium oxide according to the present invention comprises a step (a) for stabilizing the distilled residue fractionated from crude titanium tetrachoride and a step (b) for recovering vanadium oxide from the stabilized residue.

DETAILED DESCRIPTION OF THE INVENTION (a) Step for stabilizing the distilled residue: The step for stabilizing the distilled residue according to the present invention comprises contacting the residue with superheated steam uniformly in the presence of air, carbonic acid gas and carbon monoxide and then heating the residue. The residue is continuously charged into one end of a rotary reaction furnace into which steam and a combustion gas from a burner are blown through to the other end of the furnace to release chlorine as gaseous hydrogen chloride from chlorine, chloride or oxychloride in the residue. Then the residue is heated therein at a temperature higher than 100° C. to remove the absorbed steam, whereby the residue is converted into a stable oxide. This heating may be made by a means other than the reaction furnace, but when the rotary reaction furnace has a structure such that the super-heated steam strikes against the residue only at the vicinity of the inlet for the residue, the residue is heated by the heat of the burner after it is passed through the zone where steam strikes against the residue, so that the heating may be effected continuously in the common furnace. In addition, it is possible to effect the continuous operation in a multistage furnace.

Alternatively, the step for stabilizing the distilled residue may be effected in the following manner. The residue is uniformly mixed with water of about 25–35% by weight based on the residue to prevent the loss in the form of chloride or oxychloride of vanadium in the residue. Then the residue is heated at a temperature of 400–1,000° C. to remove the adsorbed water and to release chlorine in the form of gaseous hydrogen chloride from chlorine, chloride or oxychloride, whereby the residue is converted into the stable oxide.

In the residue obtained by using oil coke as the reducing agent for crude titanium tetrachloride, the carbon derived from oil coke is burnt and removed by the heating in any one of the above described stabilizing steps according to the present invention.

In the residue obtained by using hydrogen sulfide as the reducing agent for crude titanium tetrachloride, hydrogen sulfide, which is liberated in the known processes, is not even generated in any one of the above described stabilizing steps.

(b) Step for recovering vanadium oxide: Vanadium oxide is recovered by the following manner: To the residue passed through the above described stabilizing step is added at least one aqueous solution of alkali selected from the group consisting of sodium hydroxide and potassium hydroxide to dissolve only vanadium oxide. Insoluble oxides of iron, titanium, aluminum and the like are filtered off and if necessary, to the filtrate is added an oxidizing agent, such as sodium perchlorate, sodium chlorate and the like to effect oxidation. Then an acid, such as sulfuric acid, hydrochloric acid and the like is added thereto to adjust pH 0.5–2.5, whereby vanadium oxide is precipitated, and then the precipitated vanadium oxide is filtered off. In this case, the higher the concentration of the aqueous alkali solution is, the higher the dissolution and extraction percentages are, as shown in the following Table 1.

TABLE 1

| Concentration of sodium hydroxide, g./l. | Dissolution and extraction percentage of V with alkali, percent | Concentration of potassium hydroxide, g./l. | Dissolution and extraction percentage of V with alkali, percent |
|---|---|---|---|
| 150 | 45.2 | 150 | 35.4 |
| 250 | 92.0 | 250 | 91.3 |
| 350 | 98.7 | 350 | 96.4 |

The recovery step may be effected by the above described known step wherein the stabilized residue according to the present invention is roasted together with at least one alkali salt selected from the group consisting of potassium salt and sodium salt and then the roasted residue is extracted with water and the extract is made slightly acidic with an acid, such as sulfuric acid and the like, to precipitate vanadium oxide, which is filtered off.

The following examples are given for the purpose of illustration of this invention and are not intended as limitations thereof.

EXAMPLE 1

10 kg. of the distilled residue having the composition as shown in the following Table 2 was charged from one end of a rotary reaction furnace rotating at 20 r.p.m. in a rate of 200 g./min. and a flame was blown into the furnace from a gas burner provided on the other end so that the temperature at the end where the residue was charged was maintained at 120° C., the temperature at the position distanced 30 cm. from the end provided with the burner was maintained at 240° C. and the temperature in the vicinity of the opening for ejecting steam towards the end for charging the distilled residue which was inserted into the center of the furnace from the end provided with the burner was maintained at 200° C. and steam at 150° C. was ejected at a rate of 18 g./min. Then, the residue was treated for 77 minutes and the resulting stabilized residue was 7.3 kg., no smoke having been emitted into the air. The vanadium content in the stabilized residue was 20.52% calculated as $V_2O_5$, and the remaining percentage of vanadium was 96.0%, and the removing percentage of chlorine was 93.4%. CO value and $CO_2$ value of the combustion gas in the vicinity of the opening for ejecting steam was 0.02% and 0.13% respectively and $CO_2$ value of the exhausted gas containing steam at the end for charging the distilled residue was 0.21% and in the exhausted gas CO and $H_2S$ were not detected.

Then to 300 g. of the above described stabilized residue was added 900 ml. of an aqueous solution of 260 g./l. of sodium hydroxide. The resulting mixture was stirred at 80° C. for 1 hour and the insoluble components were filtered off and the filtrate was kept at 85° C. while 10 g. of sodium chlorate was added thereto. Then pH of the solution was adjusted to 1.8 by adding concentrated sulfuric acid and the thus treated solution was heated and stirred for 2 hours. The formed precipitate was filtered off and the precipitate was dried at 450° C. for 5 hours to obtain 64.4 g. of sodium hexavanadate. The recovery percentage of the vanadium component in this recovery step was 94.5%.

The thus obtained sodium hexavanadate was calcined to remove water, and powdery iron and aluminum were added thereto. From the resulting mixture a 50% Fe–50% V ferrovanadium master alloy was produced by thermite reaction. Impurities other than iron and vanadium were as follows:

Wt. percent
Al _____ 2.19
S _____ 0.03
C _____ 0.097
P _____ 0.03
Si _____ 0.14

TABLE 2

| Component: | Percent by wt. |
|---|---|
| V | 8.77 |
| Ti | 9.14 |
| Fe | 3.45 |
| Al | 2.15 |
| Si | 0.86 |
| S | 6.3 |
| Cl | 46.8 |
| Other | Balance |

EXAMPLE 2

To the stabilized residue obtained in Example 1 was added sodium carbonate in a molar ratio of $Na_2CO_3$ to $V_2O_5$ of 3:1 and the mixture was roasted in an electric furnace at 850° C. for 3 hours and then crushed into a grain size of less than 60 Tyler mesh, and 5 times by weight of water was added thereto. The resulting mixture was heated at 85–90° C. for 2 hours, and then the insoluble components were filtered off and the filtrate was adjusted in pH to 1.5 means of sulfuric acid to precipitate vanadium oxide. The recovery percentage of vanadium component was 97.5% in the recovery step.

The obtained vanadium oxide was calcined to remove water, and powdery iron and aluminum were added thereto. From the mixture, a 50% Al-50% V aluminum vanadium master alloy was produced by thermite reaction. Impurities other than aluminum and vanadium were as follows:

Wt. percent
Fe _____ 0.23
P _____ 0.029
Mo _____ 0.005
C _____ 0.063
O _____ 0.059
Si _____ 0.16
S _____ 0.005
W _____ 0.004
H _____ 0.0016
N _____ 0.001

EXAMPLE 3

The distilled residue having the composition as shown in the above described Table 2 was mixed with water of 25–35% by weight based on the residue homogeneously and the mixture was heated in an electric furnace at temperature as shown in the following Table 3 for 1 hour. The dechlorinating percentage in the stabilized residues is shown in the following Table 3.

In this stabilizing step, the vanadium component was not lost.

To each sample obtained in the above step was added 200 g. of sodium carbonate to make the molar ratio of $Na_2CO_3$ to $V_2O_5$ to 2:1. The resulting mixture was roasted in an electric furnace at 850° C. for 2 hours and crushed into a grain size of less than 60 Tyler mesh. To the crushed mass was added 500 ml. of water, and the resulting mixture was heated at 95° C. for 2 hours. The insoluble components were filtered off, and the filtrate was adjusted in pH to 1.5 by sulfuric acid to precipitate vanadium oxide. The recovery percentages of vanadium component of each sample in the recovery step are also shown in Table 3.

TABLE 3

| Heating temperature (° C.) | 200 | 400 | 600 | 800 | 1,000 | 1,200 |
|---|---|---|---|---|---|---|
| Dechlorination percentage (percent) | 34.2 | 84.8 | 89.7 | 95.3 | 99.2 | 99.6 |
| Recovering percentage of vanadium component (percent) | 43.1 | 82.3 | 85.9 | 93.4 | 98.6 | 35.2 |

What is claimed is:

1. A method for recovering vanadium oxide from a distilled residue fractionated from crude titanium tetrachloride, which comprises:
   (a) stabilizing steps including:
      uniformly contacting the residue with steam in the presence of air, carbonic acid gas, and carbon monoxide at a temperature of 120–240° C., and
      heating the thus treated residue at a temperature of higher than 100° C.; and
   (b) recovery steps including:
      adding to the stabilized residue at least one aqueous solution of alkali selected from the group consisting of sodium hydroxide and potassium hydroxide,
      filtering off insoluble substances,
      adding an acid to the filtrate to adjust the pH to 0.5–2.5, and 2. The method recited in claim 1, wherein the concentration of the aqueous solution of alkali is not lower than 250 g./l.

3. A method for recovering vanadium oxide from a distilled residue fractionated from crude titanium tetrachloride, which comprises:
   (a) stabilizing steps including:
      uniformly contacting the residue with steam in the presence of air, carbonic acid gas, and carbon monoxide at a temperature of 120–240° C., and
      heating the thus treated residue at a temperature of higher than 100° C.; and
   (b) recovery steps including:
      roasting the residue together with at least one potassium or sodium salt,
      extracting with water,
      adding an acid to the extract, and
      filtering off the formed precipitate.

4. A method for recovering vanadium oxide from a distilled residue fractionated from crude titanium tetrachloride, which comprises:
   (a) stabilizing steps including:
      uniformly mixing the residue with water of 25–35% by weight based on the residue, and
      heating the mixture at a temperature of 400–1000° C.; and
   (b) recovery steps including:
      adding to the stabilized residue at least one aqueous solution of alkali selected from the group consisting of sodium hydroxide and potassium hydroxide,
      filtering off insoluble substances,
      adding an acid to the filtrate to adjust the pH to 0.5–2.5, and
      filtering off the formed precipitate.

5. The method recited in claim 4, wherein the concentration of the aqueous solution of alkali is not lower than 250 g./l.

6. A method for recovering vanadium oxide from a distilled residue fractionated from crude titanium tetrachloride, which comprises:
   (a) stabilizing steps including:
      uniformly mixing the residue with water of 25–35% by weight based on the residue, and
      heating the mixture at a temperature of 400–1000° C.; and
   (b) recovery steps including:
      roasting the residue together with at least one potassium or sodium salt,
      extracting with water,
      adding an acid to the extract, and
      filtering off the formed precipitate.

References Cited

UNITED STATES PATENTS 2,733,980   2/1956   Lundquist _____ 423—68

FOREIGN PATENTS 16,002   1962   Japan _____ 423—62

HERBERT T. CARTER, Primary Examiner

U.S. Cl. X.R.

423—62, 592

UNITED STATES PATENT OFFICE
CERTIFICATE OF CORRECTION

Patent No. 3,754,072           Dated August 21, 1973

Inventor(s) Mitsuhiro Sato, et al.

It is certified that error appears in the above-identified patent and that said Letters Patent are hereby corrected as shown below:

Column 5, between lines 18 and 19, add this line: -- filtering off the formed precipitate. --.

Signed and sealed this 30th day of April 1974.

(SEAL)
Attest:

EDWARD M. FLETCHER, JR.          C. MARSHALL DANN
Attesting Officer                  Commissioner of Patents